United States Patent
Chen et al.

(10) Patent No.: US 11,817,604 B2
(45) Date of Patent: Nov. 14, 2023

(54) APPARATUS HAVING AT LEAST ONE FUEL CELL

(71) Applicant: WEICHAI POWER CO., LTD., Shandong (CN)

(72) Inventors: Wenmiao Chen, Shandong (CN); Yupeng Wang, Shandong (CN); Thomas Vetter, Lorch (DE); Ji Zhang, Shandong (CN)

(73) Assignee: WEICHAI POWER CO., LTD., Weifang (CN)

( * ) Notice: Subject to any disclaimer, the term of this patent is extended or adjusted under 35 U.S.C. 154(b) by 110 days.

(21) Appl. No.: 17/606,362

(22) PCT Filed: Mar. 18, 2020

(86) PCT No.: PCT/EP2020/057380
§ 371 (c)(1),
(2) Date: Oct. 25, 2021

(87) PCT Pub. No.: WO2020/216534
PCT Pub. Date: Oct. 29, 2020

(65) Prior Publication Data
US 2022/0246960 A1    Aug. 4, 2022

(30) Foreign Application Priority Data

Apr. 25, 2019   (DE) ...................... 20 2019 102 314.7

(51) Int. Cl.
*H01M 8/043*         (2016.01)
*H01M 8/04298*    (2016.01)
(Continued)

(52) U.S. Cl.
CPC ...... *H01M 8/04305* (2013.01); *H01M 8/0432* (2013.01); *H01M 8/0438* (2013.01);
(Continued)

(58) Field of Classification Search
CPC ........... H01M 8/04298; H01M 8/0432; H01M 8/04305; H01M 8/0438; H01M 8/04544;
(Continued)

(56) References Cited

U.S. PATENT DOCUMENTS 8,872,392 B1   10/2014 Gurunathan et al.
9,843,056 B2 * 12/2017 Hoshi ............... H01M 8/04589
(Continued)

FOREIGN PATENT DOCUMENTS

DE    102013220333 A1   12/2014
DE    102015225353 A1    6/2017
(Continued)

OTHER PUBLICATIONS

PCT International Search Report and Written Opinion, PCT/EP2020/057380, dated May 29, 2020, 15 pgs.

*Primary Examiner* — Amanda C. Walke
(74) *Attorney, Agent, or Firm* — Fenwick & West LLP

(57) ABSTRACT

The invention relates to a device (1) having at least one fuel cell (2) and a DC/DC converter (3) assigned to the latter. A variable voltage generated in the fuel cell (2) is converted, by means of the DC/DC converter (3), into a DC voltage for a system (4) to be supplied. The DC/DC converter (3) is designed to capture internal characteristic variables of the fuel cell (2). Operating states of the fuel cell (2) are captured and/or controlled in dependence on these characteristic variables.

19 Claims, 3 Drawing Sheets

Figure 1:
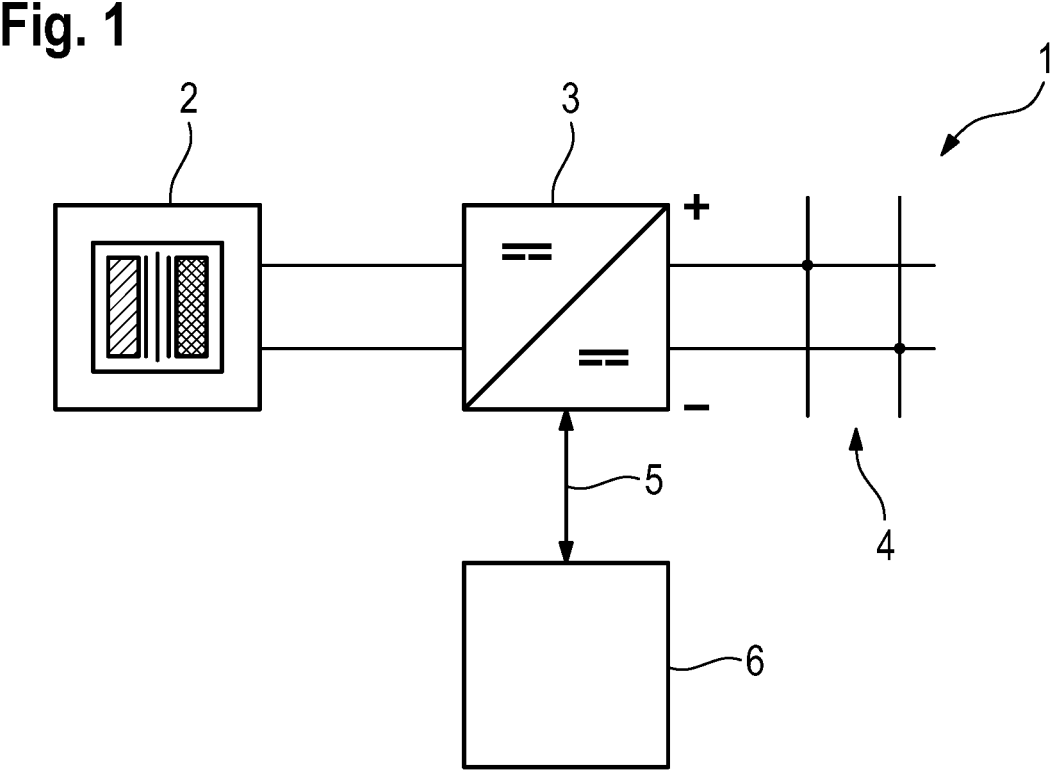

(51) Int. Cl.
*H01M 8/0432* (2016.01)
*H01M 8/0438* (2016.01)
*H01M 8/04537* (2016.01)
*H01M 8/04746* (2016.01)
*H01M 8/04858* (2016.01)
*H02M 3/00* (2006.01)

(52) U.S. Cl.
CPC ... *H01M 8/04544* (2013.01); *H01M 8/04574* (2013.01); *H01M 8/04753* (2013.01); *H01M 8/04895* (2013.01); *H02M 3/00* (2013.01)

(58) Field of Classification Search
CPC ......... H01M 8/04574; H01M 8/04753; H01M 8/04895
See application file for complete search history.

(56) References Cited

U.S. PATENT DOCUMENTS

| 2014/0272645 A1* | 9/2014 | McLean | H01M 8/0491 |
| | | | 429/428 |
| 2016/0006061 A1 | 1/2016 | Choi et al. | |
| 2016/0141668 A1* | 5/2016 | Yamamori | H01M 8/0494 |
| | | | 429/429 |

FOREIGN PATENT DOCUMENTS

| DE | 102015225354 A1 | 6/2017 | |
| WO | WO-2014198485 A1 * | 12/2014 | H01M 8/0432 |

* cited by examiner

APPARATUS HAVING AT LEAST ONE FUEL CELL

The invention relates to a device having at least one fuel cell.

In such a device, the fuel cell can be assigned a DC/DC converter that converts a variable voltage generated in the fuel cell into a direct current voltage that is generally fed into a system that is to be supplied with such a direct current voltage.

Fuel cells are becoming increasingly significant in carbon-reduced and carbon-free energy supply. This applies to both mobile applications as well as stationary applications. The mobile applications range from conventional automobiles to various types of industrial trucks, through to mobile work machines and ships. The stationary applications primarily relate to the generation of electrical current as an isolated grid or for feeding into public grids.

The cost of usage per operating hour and, related to this, the service life, of a fuel cell are essential aspects for cost-effective use of fuel cells.

The service life of fuel cells is often undesirably limited, however. For example, in hydrogen fuel cells, the polymer membrane that functions as electrolyte is an essential factor that limits service life.

During operation of the fuel cell, the polymer membrane sags at weak points under mechanical load, which produces a pin hole. This is followed by the chemical decomposition that occurs as a result of the gas flow through the damaged region. The chemically-induced weakening of the polymer makes the membrane more susceptible to mechanical load; the damaged regions become larger, which then accelerates the chemical decomposition. Both effects therefore mutually magnify one another. If sufficient gas flow occurs, finally thermal decomposition (combustion) can begin, such that the fuel cell is destroyed.

The invention is based on the problem of providing a device of the aforementioned type that has a high level of functionality with low design expense.

For resolving this problem, the features of claim 1 are provided. Advantageous embodiments and expedient further developments of the invention are described in the dependent claims.

The invention relates to a device having at least one fuel cell and a DC/DC converter assigned to the latter. A variable voltage generated in the fuel cell is converted, by means of the DC/DC converter, into a DC voltage for a system to be supplied. The DC/DC converter is designed to capture internal characteristic variables of the fuel cell. Operating states of the fuel cell are captured and/or controlled in dependence on these characteristic variables.

The functionality of the device according to the invention is enhanced in that the DC/DC converter can be used for more than merely to generate a stable DC voltage from the variable voltage of the fuel cell, which stable DC voltage can be used to supply an external system.

Rather, according to the invention, characteristic variables of the fuel cell can be captured using the DC/DC converter, wherein it is advantageous for this capturing to occur continuously and in a time-indexed manner. Information about the current operating state of the fuel cell can be obtained from capturing these characteristic variables, which enables comprehensive control of the fuel cell. According to the invention, the control in question goes beyond mere 'control' in the sense of 'monitoring' the fuel cell. Rather, control operations can be performed, especially dependent upon the captured characteristic variables, which control operations are adapted to the current operating state of the fuel cell or also can optimize the operating states of the fuel cell.

Suitable sensors that are integrated into or assigned to the DC/DC converter can be provided for capturing characteristic variables.

The data collection is generally not limited to the direct measurement of characteristic variables by the DC/DC converter. Rather, data available in the fuel cell can be read by the DC/DC converter, if present.

It is especially advantageous for information about the current wear of the fuel cell to be obtained from the characteristic variables.

In particular, the wear status, wear factors and/or the remaining service life of the fuel cell are ascertained.

According to the invention, the above-mentioned obtained information is used for controlling the operation of the fuel cell, wherein it is advantageous for the control to be implemented such that the service life of the fuel cell is extended, which significantly augments the functionality of the device according to the invention.

Advantageously, current and voltage of the fuel cell are ascertained as characteristic variables.

Moreover, mass flows and the operating temperature of the fuel cell are ascertained as additional characteristic variables.

It is advantageous for these characteristic variables to be captured in a time-indexed manner. The operating state of the fuel cell can be fully captured upon the basis of these characteristic variables.

In particular, the operating characteristic curve of the fuel cell can be captured.

The operating characteristic curve of the fuel cell indicates the voltage in dependence on the current for defined mass flows of the operating materials of the fuel cell and the operating temperature of the latter.

The wear status of the fuel cell can be ascertained especially well upon the basis of this operating characteristic curve. Moreover, additional evaluations can be performed upon the basis of the operating characteristic curve.

According to an advantageous embodiment, a modulation of the current of the fuel cell is performed by means of the DC/DC converter to ascertain operating states. Simultaneously, the voltage of the fuel cell is determined.

It is essential here that the amplitude of the modulation be so small that the DC voltage generated with the fuel cell and the DC/DC converter remains unimpaired.

Given otherwise constant operating data of the fuel cell, such as the mass flow in the fuel cell, the modulation of the draw current occurs periodically within a small amplitude and at a suitably selected frequency. Current and voltage of the fuel cell are measured in real time, wherein the relationship of voltage to current is ascertained, in terms of amplitude and phase, synchronously with the modulation. Conclusions about the operating state and age deterioration status of the fuel cell can be drawn from these measurements.

Additional relevant information about the status of the fuel cell can be produced by measuring a frequency-dependent impedance. To this end, the current is drawn in the form of a mean (DC current) upon which is superimposed an additional AC current (sinusoidal, adjustable frequency). The amplitude of the AC portion is significantly smaller than the DC value. With the proposed arrangement, frequencies ranging from far lower than 1 Hz through to the kHz range can be generated by means of the DC/DC converter.

According to an advantageous further development, the mass flow of the fuel cell is modulated by means of the DC/DC converter to ascertain characteristic variables.

In this case, in addition to the current, i.e. draw current of the fuel cell, the mass flow, i.e., the flow of mass within the fuel cell, is also modulated, namely at a frequency at which the fuel cell can follow the modulation, wherein the modulation is so small that the system to be supplied is not impaired. These measurements, as well, allow for conclusions to be drawn regarding the operating state, especially the age deterioration, i.e. wear status, of the fuel cell.

It is especially advantageous for a classification of operating states to be performed.

In general, a classification is performed of the data resulting from the capturing of characteristic variables, as well.

This serves to reduce the accrued data volume for the evaluation.

According to an advantageous embodiment, measurement values captured in the DC/DC converter can be read by to an external computing unit. The computing unit is designed for evaluating the measurement data.

In particular, the computing unit can be part of a cloud.

The coupling to the computing unit can be accomplished with a wireless data transmission path, wherein especially radio signals are used for data transmission.

This enables flexible evaluation of the data from the fuel cell that takes place in a location spatially completely separate from the device.

Computational models for calculating the wear or optimizing the operation of the fuel cell can be ascertained in the computing unit and/or in the DC/DC converter upon the basis of the measurement data.

Moreover, a report regarding the operating state of the fuel cell and/or data for the further development of the fuel cell and/or maintenance data is generated in the computing unit upon the basis of measurement data of the fuel cell.

The operating characteristic curve of the fuel cell captured in the DC/DC converter is especially suited as measurement data to be evaluated for this purpose.

According to an advantageous embodiment of the invention, the DC/DC converter and/or a control unit is assigned for controlling the operation of the fuel cell.

The device according to the invention is highly flexible due to the circumstance that the operation of the fuel cell can be optionally controlled in the DC/DC converter or in the control unit.

It is especially advantageous for the device according to the invention to be further developed to have an energy store that is integrated in the control of the fuel cell.

The energy store is especially a battery or a capacitor.

The additional energy store enables expanded and more flexible control of the fuel cell, especially for optimizing its operation. The additional energy store enables flexibility in the operation of the fuel cell such that power is not drawn continuously from the fuel cell. Instead, power can also be drawn from the energy store by turns. Moreover, operation of the device is also possible such that power is drawn simultaneously from the energy store and the fuel cell. This enables a flexible operation of the device that serves to optimize the operation of the fuel cell, especially to extend the service life of the fuel cell.

The start-stop cycles of the fuel cell, in particular, can be captured during operation of the fuel cell as an essential factor for its age deterioration. It is advantageous to reduce the number of start-stop cycles of the fuel cell by involving the energy store and thereby extend the service life of the fuel cell.

Moreover, the idle times of the fuel cell can be reduced by involving the energy store in the control of the device. While the fuel cell is idling, there is low current but high voltage, which is harmful for the fuel cell, especially its membrane.

Moreover, by involving the energy store in the control, current changes in the fuel cell can be minimized, i.e., rapid current changes or load peaks that result in increased wear of the fuel cell can be largely prevented.

According to an advantageous embodiment, the device has at least one additional fuel cell with an assigned DC/DC converter, which are both involved in the control of the first fuel cell.

In this case, the draw current of at least one fuel cell is modulated such that a regenerative operating state is produced in this fuel cell.

It is advantageous for the draw currents from both fuel cells to be modulated such that an at least approximately constant power output is ensured using these fuel cells.

It is especially advantageous to produce a regenerative operating state of the fuel cell by operating the fuel cell for a short period at excessive current and therefore reduced voltage. The regenerative operating state is produced by operating the fuel cell for a time-limited period in an otherwise prohibited operating state, specifically with excessive current and therefore reduced voltage at the fuel cell. In this state, the fuel cell works at very low efficiency and therefore becomes warmer. The membrane deteriorates more at higher temperature and this is the reason for the time limitation. However, contaminants, especially nitrogen oxides, accumulated on the catalyst are placed into a state of higher oxidation due to the higher temperature and, as a result, dissipate in gaseous form. The catalyst therefore regenerates and the fuel cell again delivers higher power and has retroactively improved efficiency.

Such a regeneration can require operating states that can impair the functioning of the superordinate system to be supplied. This problem can be solved in that at least two fuel cells in a networked system are suitably coupled via the two DC/DC converters and the modulations take place such that the sum of the output fed into the system from the two fuel cells can be kept approximately constant. Alternatively, an energy store present in the system can be used for this purpose.

According to an advantageous embodiment, a combination of a fuel cell and an energy store is provided, wherein the current draw from the fuel cell is modulated to measured values and this output is fed into the energy store, such that a modulation of the current in the energy store is generated and the current and voltage of the energy store are ascertained as measured variables.

If the current draw from the fuel cell is modulated for purposes of taking measurements (direct current as well as superimposed alternating current) and this output is fed into a connected battery and it is simultaneously ensured that other devices cannot draw any relevant output from the battery, then a modulation (direct current and alternating current) also exists in the battery. On this side, the current and voltage are measured, such that the battery can also be measured in parallel with the fuel cell.

The invention is explained below based on the drawings. They show:

FIG. 1: A first exemplary embodiment of the device according to the invention.

Figure 2:
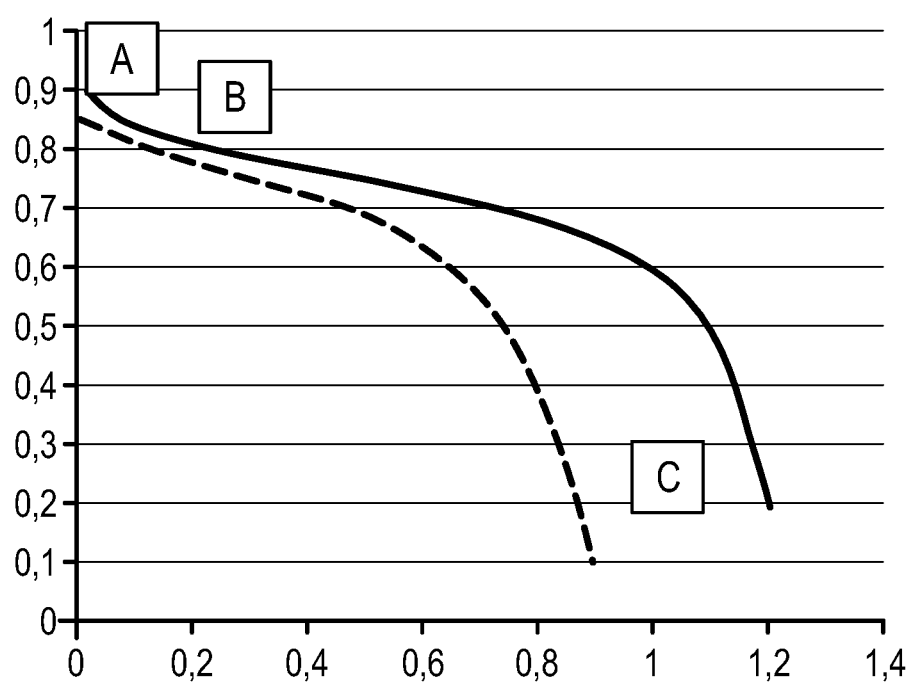

FIG. 2: An example of an operating characteristic curve of a fuel cell for the device according to FIG. 1.

Figure 3:
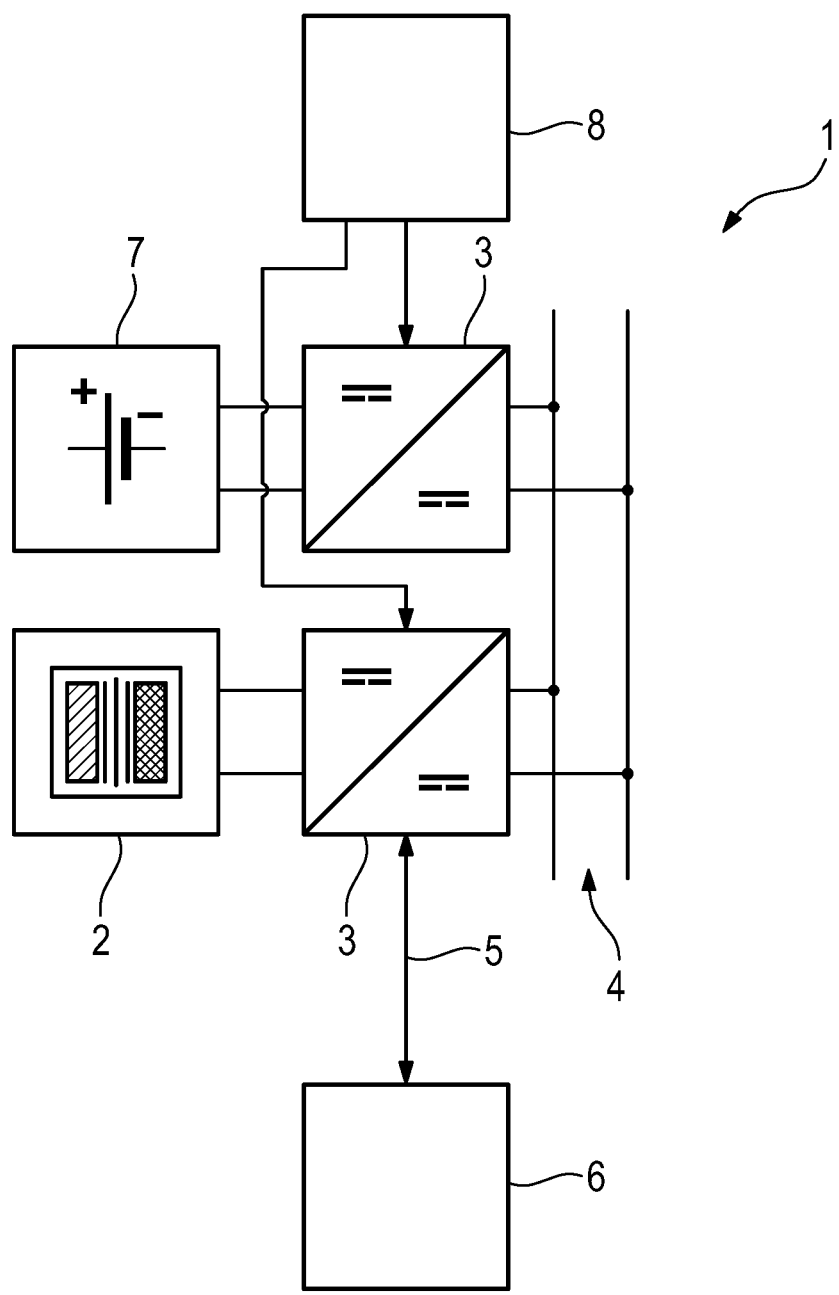

FIG. 3: A second exemplary embodiment of the device according to the invention.

Figure 4:
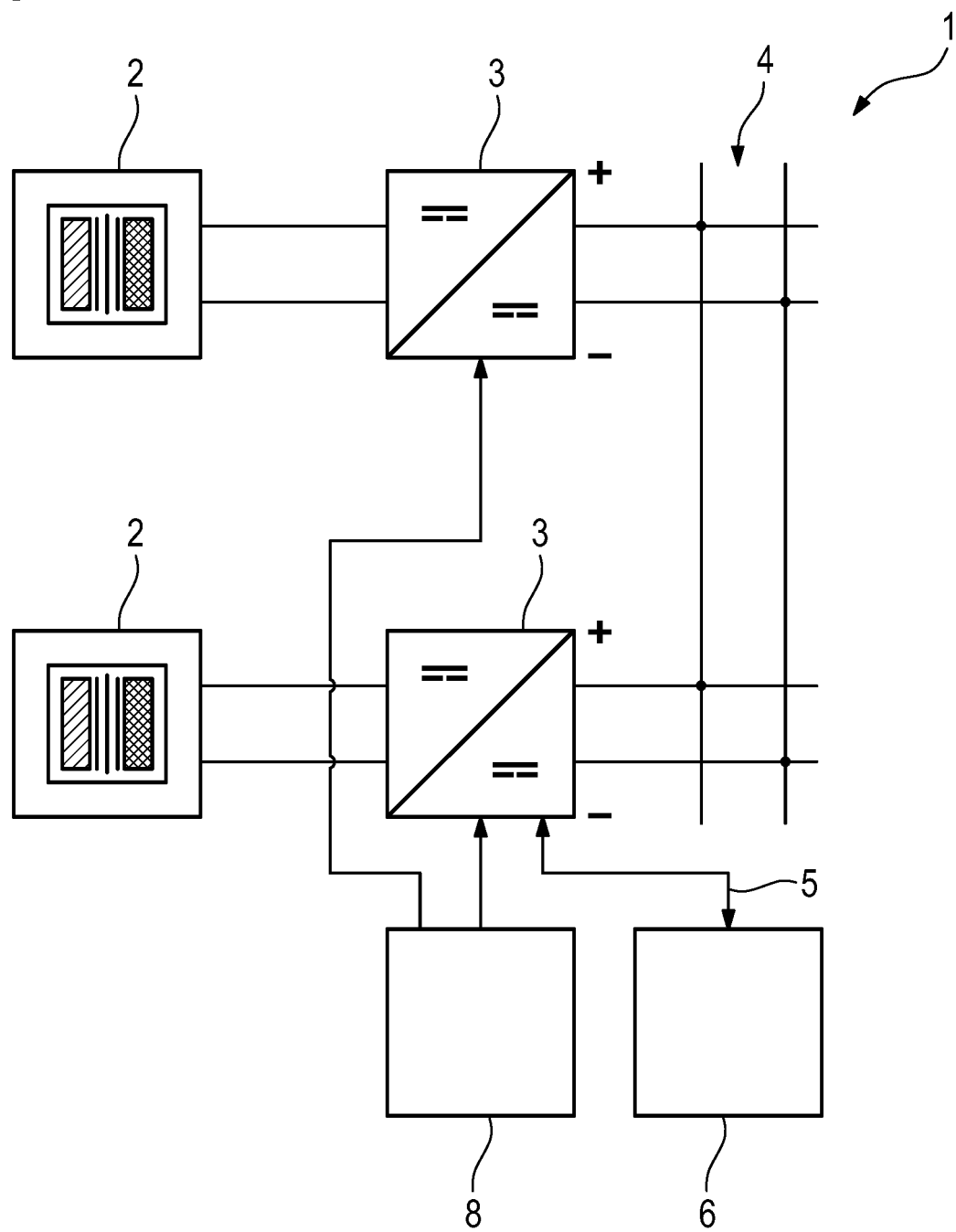

FIG. 4: A third exemplary embodiment of the device according to the invention.

FIG. 1 shows a first exemplary embodiment of the device 1 according to the invention. The device 1 has a fuel cell 2 that is connected to a system 4 to be supplied via a DC/DC converter 3.

In this and the following examples, the fuel cell 2 is provided in the form of a PEM (Proton Exchange Membrane) fuel cell 2, operated with hydrogen.

A variable voltage generated in the fuel cell 2 is converted into a DC voltage by the DC/DC converter 3, which DC voltage is used for supplying energy to the system 4.

An optional device in the form of a computing unit 6 is connected to the DC/DC converter 3 via a data transmission path 5. Bidirectional data exchange is possible via the data transmission path 5, especially through radio signals. The computing unit 6 can be a cloud computer of a cloud.

According to the invention, the DC/DC converter 3 is additionally used to capture characteristic variables of the fuel cell 2, wherein the DC/DC converter 3 can state the characteristic variables or read them from the fuel cell 2.

Suitable sensors that are integrated into or assigned to the DC/DC converter can be provided for this purpose.

Current and voltage of the fuel cell can be ascertained as characteristic variables.

Moreover, mass flows and the operating temperature of the fuel cell can be ascertained as additional characteristic variables.

Finally, the operating characteristic curve of the fuel cell can be captured.

One example of such an operating characteristic curve is shown in FIG. 2. That graph shows the relationship between the voltage of a fuel cell 2 in dependence on the current density in $A/cm^2$.

The solid line represents an operating characteristic curve of a brand-new fuel cell 2. The dashed line shows the status of the fuel cell 2 after several thousand operating hours.

The diagram from FIG. 2 shows various regions A, B, C that have the following meanings.

A: The region in which undesired penetration of the hydrogen through the membrane has begun as a result of age deterioration and consequently, the voltage also falls at low current densities.

B: The region in which the loss of active catalyst surface area is evident.

C: The region in which the increase in resistance of the mass flow or its effect is evident.

As shown in FIG. 2, information about the age deterioration status can be obtained by ascertaining, preferably in a continuous and time-indexed manner, the operating characteristic curve, whereby especially the wear status, the remaining service life as well as wear factors, are determined in the DC/DC converter 3. The same applies to the capturing of the other stated characteristic variables.

Specifically, a micro-modulation method can be performed for capturing the wear status of the fuel cell 2.

Specifically, a modulation of the fuel cell current is performed by means of the DC/DC converter in order to ascertain operating states, wherein the voltage of the fuel cell is determined simultaneously.

The amplitude of the modulation is so small that the DC voltage generated by the fuel cell and DC/DC converter remains unimpaired.

During this modulation, other influencing variables, such as the mass flow, remain constant in the fuel cell 2.

Alternatively, the current, i.e. the draw current, and the mass flow in the fuel cell 2 can be modulated to capture the age deterioration status.

It is useful for an evaluation of the measurement data ascertained with the DC/DC converter 3 to be performed in the computing unit 6. A classification of operating states of the fuel cell 2 can be performed in the computing unit 6 based on the ascertained characteristic variables.

Moreover, computational models for calculating the wear or optimizing the operation of the fuel cell 2 can be ascertained in the computing unit 6 and/or in the DC/DC converter 3 upon the basis of the measurement data from the fuel cell 2.

Finally, a report about the operating state of the fuel cell 2 and/or data for the further development of the fuel cell 2 and/or maintenance data can be generated in the computing unit 6 upon the basis of the measurement data from the fuel cell 2.

According to the invention, the DC/DC converter 3 can also be used for controlling the operation of the fuel cell 2.

A device 1 especially suitable for doing so is shown in FIG. 3.

As compared to the device 1 from FIG. 2, the device shown in FIG. 3 has been further developed in that an energy store, which is formed as a battery 7, is connected via an additional DC/DC converter 3 to the system 4 to be supplied. Alternatively, a capacitor can be used as an energy store.

Both DC/DC converters 3 are connected to a control unit 8.

The control unit 8 and/or the DC/DC converter 3 assigned to the fuel cell 2 control the operation of the fuel cell 2, and especially such that the service life of the fuel cell 2 is extended.

The control of the fuel cell is implemented especially such that the start-stop cycles of the fuel cell 2 are minimized and/or that the idling times of the fuel cell 2 are minimized and/or that current changes of the fuel cell 2 are minimized.

This control is implemented in dependence on the ascertained characteristic variables.

FIG. 4 shows an additional exemplary embodiment of the device 1 according to the invention. Compared to the device 1 from FIG. 2, it has been expanded such that each of two fuel cells 2 is respectively connected via an additional DC/DC converter 3 to the system 4 to be supplied. Both DC/DC converters 3 are connected to a control unit 8.

The device 1 from FIG. 4 can be further developed such that an energy store is connected via an additional DC/DC converter 3 to the system 4 to be supplied.

In this case, the draw currents from the fuel cell 2 are modulated via the fuel cell 2 such that a regenerative operating state is produced in the fuel cell 2.

It is advantageous for the draw currents from both fuel cells 2 to be modulated such that an at least approximately constant power output is ensured from these fuel cells 2.

LIST OF REFERENCES (1) device
(2) fuel cell
(3) DC/DC converter
(4) system to be supplied
(5) data transmission path
(6) computing unit
(7) battery
(8) control unit

What is claimed is:

1. A device (1) with at least one fuel cell (2) and a DC/DC converter (3) assigned thereto, wherein a variable voltage generated in the fuel cell (2) is converted into a DC voltage by means of a DC/DC converter (3) for a system (4) to be supplied, characterized in that the DC/DC converter (3) is designed to capture internal characteristic variables of the fuel cell (2), wherein operating states of the fuel cell (2) are captured and/or controlled in dependence on these characteristic variables, wherein a regenerative operating state of the fuel cell (2) is achieved by operating it for a short time at excessive current and therefore, reduced voltage.

2. The device (1) according to claim 1, characterized in that current and voltage of the fuel cell (2) are captured as characteristic variables and/or mass flows and the operating temperature of the fuel cell (2) are captured as additional characteristic variables.

3. The device (1) according to claim 2, characterized in that the operating characteristic curve of the fuel cell (2) is captured.

4. The device (1) according to claim 2, characterized in that sensors that are integrated into or assigned to the DC/DC converter (3) are provided for capturing characteristic variables and/or that a modulation of the current of the fuel cell (2) is performed by means of the DC/DC converter (3) in order to capture operating states, and that the voltage of the fuel cell (2) is determined synchronously thereto.

5. The device (1) according to claim 2, characterized in that the wear status, wear factors and/or the remaining service life of the fuel cell (2) are ascertained, and/or that a classification of operating states is performed.

6. The device (1) according to claim 1, characterized in that the operating characteristic curve of the fuel cell (2) is captured.

7. The device (1) according to claim 6, characterized in that sensors that are integrated into or assigned to the DC/DC converter (3) are provided for capturing characteristic variables and/or that a modulation of the current of the fuel cell (2) is performed by means of the DC/DC converter (3) in order to capture operating states, and that the voltage of the fuel cell (2) is determined synchronously thereto.

8. The device (1) according to claim 1, characterized in that sensors that are integrated into or assigned to the DC/DC converter (3) are provided for capturing characteristic variables and/or that a modulation of the current of the fuel cell (2) is performed by means of the DC/DC converter (3) in order to capture operating states, and that the voltage of the fuel cell (2) is determined synchronously thereto.

9. The device (1) according to claim 8, characterized in that the amplitude of the modulation is so small that the DC voltage generated by the fuel cell (2) and the DC/DC converter (3) remains unimpaired.

10. The device (1) according to claim 9, characterized in that the mass flow of the fuel cell (2) is modulated by means of the DC/DC converter (3) in order to ascertain characteristic variables.

11. The device (1) according to claim 8, characterized in that the mass flow of the fuel cell (2) is modulated by means of the DC/DC converter (3) in order to ascertain characteristic variables.

12. The device (1) according to claim 1, characterized in that the wear status, wear factors and/or the remaining service life of the fuel cell (2) are ascertained, and/or that a classification of operating states is performed.

13. The device (1) according to claim 12, characterized in that computational models for calculating the wear or optimizing the operation of the fuel cell (2) are ascertained as dependent on measurement data from the fuel cell (2).

14. The device (1) according to claim 12, characterized in that a report and/or data for the further development of the fuel cell (2) and/or maintenance data are generated in the computing unit (6) as dependent on the measurement data of the fuel cell (2).

15. The device (1) according to claim 1, characterized in that measurement values captured in the DC/DC converter (3) can be read by an external computing unit (6), wherein the computing unit (6) is designed for evaluating the measurement data, and/or is part of a cloud.

16. The device (1) according to claim 1, characterized in that the DC/DC converter (3) and/or a control unit (8) is assigned for controlling the operation of the fuel cell (2).

17. The device (1) according to claim 16, characterized in that the control of the fuel cell (2) is designed such that the start-stop cycles of the fuel cell (2) are minimized, and/or that idling times of the fuel cell (2) are minimized, and/or that current changes of the fuel cell (2) are minimized.

18. The device (1) according to claim 1, characterized in that it has an energy store, which is involved in the control of the fuel cell (2), wherein the energy store is especially a battery (7) or a capacitor.

19. The device (1) according to claim 1, characterized in that a combination of a fuel cell (2) and an energy store is provided, wherein the current draw from the fuel cell (2) is modulated based on measurement values and this power is fed into the energy store, such that a modulation of the current in the energy store is generated and the current and the voltage of the energy store are determined as measurement values.

* * * * *